(12) United States Patent
Strand

(10) Patent No.: US 9,511,382 B2
(45) Date of Patent: Dec. 6, 2016

(54) NOZZLE FOR DISTRIBUTION OF A FLUID

(71) Applicant: Skanska Sverige AB, Stockholm (SE)

(72) Inventor: Tobias Strand, Farsta (SE)

(73) Assignee: SKANSKA SVERIGE AB, Stockholm (SE)

( * ) Notice: Subject to any disclaimer, the term of this patent is extended or adjusted under 35 U.S.C. 154(b) by 0 days.

(21) Appl. No.: 14/439,772

(22) PCT Filed: Nov. 1, 2013

(86) PCT No.: PCT/SE2013/051282
§ 371 (c)(1),
(2) Date: Apr. 30, 2015

(87) PCT Pub. No.: WO2014/070097
PCT Pub. Date: May 8, 2014

(65) Prior Publication Data
US 2015/0283565 A1    Oct. 8, 2015

(30) Foreign Application Priority Data

Nov. 1, 2012   (SE) ..................................... 1251240

(51) Int. Cl.
*F28D 20/00*     (2006.01)
*B05B 1/14*       (2006.01)
(Continued)

(52) U.S. Cl.
CPC . *B05B 1/26* (2013.01); *B05B 1/14* (2013.01); *F28D 20/0039* (2013.01);
(Continued)

(58) Field of Classification Search
CPC .............. F28D 20/0034; F28D 20/0039; F28D 20/0043; F28D 2020/0069; F28D 2020/0073; B05B 1/14; B05B 1/26; B05B 1/265; B05B 1/267; F28F 13/06; Y02E 60/142
See application file for complete search history.

(56) References Cited

U.S. PATENT DOCUMENTS 2,766,200 A * 10/1956 Kaufman ................ C23F 13/02
                                                                122/19.1
3,737,105 A    6/1973 Arnold et al.
(Continued)

FOREIGN PATENT DOCUMENTS

DE    10 2007 056 720    6/2009
EP    2 418 449          2/2012
(Continued)

*Primary Examiner* — Darren W Gorman
(74) *Attorney, Agent, or Firm* — Kagan Binder, PLLC

(57) ABSTRACT

The present invention relates to a nozzle (100) for distribution of a fluid having a speed. The nozzle (100) defines a plurality of flow passages (150, 160, 170), at least one of the plurality of flow passages (150, 160, 170) is a central flow passage (160) and at least a first and a second of the plurality of flow passages (150, 160, 170) are outer flow passages (150, 170). The outlets (152, 172) of the outer flow passages (150, 170) are arranged on either side of the outlet (162) of the central flow passage (160). The second outer flow passage (170) has an inlet area (235) which is smaller than an outlet area (a3). A central axis of the inlets (210, 220, 230) is substantially perpendicular to a central plane of the outlets (152, 162, 172).

14 Claims, 3 Drawing Sheets

(51) Int. Cl.
*F28F 13/06* (2006.01)
*B05B 1/26* (2006.01)

(52) U.S. Cl.
CPC ...... *F28F 13/06* (2013.01); *F28D 2020/0069* (2013.01); *Y02E 60/142* (2013.01)

(56) References Cited

U.S. PATENT DOCUMENTS

| | | | |
|---|---|---|---|
| 3,923,248 A | | 12/1975 | Cresswell |
| 6,138,614 A | * | 10/2000 | Shropshire ............... F24H 9/124 |
| | | | 122/13.3 |
| 6,199,515 B1 | * | 3/2001 | Clarke ...................... F24H 1/18 |
| | | | 122/13.01 |
| 6,379,146 B1 | | 4/2002 | Zink et al. |
| 2008/0163950 A1 | * | 7/2008 | Andersen ............ F28D 20/0039 |
| | | | 138/39 |

FOREIGN PATENT DOCUMENTS

| | | |
|---|---|---|
| WO | 2007/065001 | 6/2007 |
| WO | 2010/045011 | 4/2010 |

* cited by examiner

NOZZLE FOR DISTRIBUTION OF A FLUID

This application claims benefit from International Application No. PCT/SE2013/051282, which was filed on Nov. 1, 2013, which claims priority to Swedish Patent Application No. 1251240-6, which was filed Nov. 1, 2012, the entireties of said patent applications are incorporated herein by reference.

FIELD OF THE INVENTION

The present invention relates to the field of nozzles, and more specifically to a nozzle for distribution of a fluid.

BACKGROUND OF THE INVENTION

Fluids are known to form horizontal layers depending on gravity and on the density of the fluid. An example of a property that influences the density of a fluid is temperature. For example, water with the temperature of 4° C. has the highest density of all liquid water. Water stratification occurs when water masses with different properties, such as temperature, form layers. Stratification may be upset by turbulence which leads to mixed layers of water.

A field in which stratification is of importance is the field of energy storages wherein a fluid, such as e.g. water, may be used for storing thermal energy. The thermal energy of the water is preserved to a great extent during an extended period of time, where conduction is the main reason for heat transfer. In such an application, energy may be charged to the storage by retrieving cool water from one level of the storage, heating the retrieved water in a heat exchanger and then returning the heated water to the storage at a level with the corresponding temperature. For discharge of energy hot water is retrieved from the storage, cooled in a heat exchanger and returned to the storage at a level with the corresponding temperature. In this type of application it is important to keep water with different temperatures unmixed when water is supplied to the storage, i.e. to keep the stratification intact. It is thus of importance to create as low turbulence as possible in the energy storage when providing water to the storage.

SUMMARY OF THE INVENTION

An object according to an aspect of present invention is to provide a nozzle which reduces the occurrence of turbulence mixing within, e.g., a thermal energy storage, hence reducing overall thermal exergy losses. The most critical situation, in this context, is the distribution of fluid into a stagnant fluid volume.

According to a first aspect of the present invention, these objects are achieved by a nozzle for distribution of a fluid having a speed, the nozzle defining a plurality of flow passages, each of the plurality of flow passages having an inlet arranged to receive the fluid from a pipe and an outlet, at least one of the plurality of flow passages being a central flow passage and at least a first and a second of the plurality of flow passages being outer flow passages, the outlets of the outer flow passages being arranged on either side of the outlet of the central flow passage, the inlet of the first outer flow passage enclosing the inlet of the central passage and the inlet of the central passage enclosing the inlet of the second outer flow passage, the second outer flow passage having an inlet area being smaller than an outlet area, a central axis of the inlets being substantially perpendicular to a central plane of the outlets.

By having an inlet area of a passage that is smaller than an outlet area of the same passage, the fluid received by the inlet has a speed that is larger compared to a speed of the fluid flowing out of the outlet. The flow passages according to the present invention are arranged such that the parts of the fluid with the highest speed are flowing out from the outlet of the central flow passage and parts of the fluid with a lower speed are flowing out from the outlet of the first and second outer flow passages. The outlet of the first outer flow passage is arranged above the outlet of the central flow passage along the central axis of the inlets. The outlet of the second outer flow passage is arranged beneath the outlet of the central flow passage along the central axis of the inlets. Consequently, the stream of fluid flowing out from the nozzle via the outlets may have a central portion with high flow speed and outer portions with a low flow speed, the outer portions surrounding the central portion such that the stream may create a low turbulence flow. This is advantageous in that if the fluid is distributed into a stagnant fluid volume, turbulence that is allowed in the interface of the fluid flowing from the outlet of the central flow passage and the fluid flowing from the outlets of the first and second outer flow passages does not disturb the stagnant fluid volume.

In a further embodiment of the present invention, the nozzle may further comprise: an outer cylindrical wall extending along the central axis of the inlets, an inner cylindrical partition wall and an outer cylindrical partition wall, the walls extending along the central axis of the inlets, the inner cylindrical partition wall being enclosed by the outer cylindrical partition wall, the outer cylindrical partition wall being enclosed by the outer cylindrical wall, the central passage being formed between the outer partition wall and the inner partition wall, the first outer flow passage being formed between the outer wall and the outer partition wall, and the second outer flow passage being formed inside the inner partition wall.

The circular walls are particularly useful when mounting the nozzle on a circular pipe. By using circular walls, fluid may flow through the nozzle with a higher speed, as compared to using a noncircular pipe having the same cross-sectional area. A further advantage with this embodiment is that a circular wall with a smaller diameter can be used, leading to a more cost efficient nozzle.

According to another embodiment of the present invention, the nozzle may further comprise: the inner partition wall extending further along the central axis of the inlets compared to the outer partition wall, the outer partition wall extending further along the central axis of the inlets compared to the outer wall.

According to yet another embodiment, the nozzle may further comprise: the outlet of the first outer flow passage being defined by an end of the outer wall and a first flange extending from an end of the outer partition wall in a direction substantially perpendicular to the outer partition wall, the outlet of the central flow passage being defined by the first flange and a second flange extending from an end of the inner partition wall in a direction substantially perpendicular to the inner partition wall, the outlet of the second outer flow passage being defined by the second flange and a bottom plate positioned below the second flange along the central axis of the inlets, the bottom plate extending substantially perpendicular to the central axis of the inlets.

According to an embodiment of the present invention, a relation between sizes of the inlets and the outlets is such that the speed of the fluid flowing out of each outlet of the first and second outer flow passages is substantially lower than the fluid flowing out of the outlet of the central flow passage. In one embodiment, the speed of the fluid flowing out of each outlet of the first and second outer flow passages is half of the speed of the fluid flowing out of the outlet of the central flow passage. Thus, a low turbulence flow may be achieved between the fluid and a stagnant fluid volume into which the fluid is distributed.

According to yet another embodiment of the present invention, the first outer flow passage has an inlet area that is smaller than an outlet area. The central flow passage may also have an inlet area that is smaller than an outlet area. An effect of having an outlet area that is smaller than the inlet area is, as previously discussed, that the speed of a fluid flowing out from the outlet is lower than the speed of the fluid received by the inlet. By dimensioning the respective inlets and outlets of the nozzle, the desired speed of the fluid flowing out of the respective outlets may be achieved.

According to another embodiment of the present invention, the outlet area of the first outer flow passage is smaller than the outlet area of the second outer flow passage. This may be advantageous if the speed of the fluid flowing through the first outer flow passage is lower than the speed of the fluid flowing through the second outer flow passage but the same speed of the fluids flowing out of the respective flow passages is desired.

The nozzle may further comprise at least one sub-partition wall extending along the central axis of the inlets, said sub-partition wall being configured to divide each of the plurality of flow passages into at least two substantially equally sized sub-flow passages. The nozzle may further comprise a first sub-partition wall and a second sub-partition wall, being arranged perpendicularly to each other. These sub-partitions are used for achieving a more equal radial distribution of the fluid flowing out from the nozzle, such that horizontal jet forces do not occur. According to an embodiment of the present invention, the nozzle is connected to a telescopic pipe. This may be advantageous if the nozzle is used for distributing fluid in several levels, e.g. in the energy storage.

According to a second aspect of the present invention, the present invention provides use of a nozzle according to the first aspect of the invention for distribution of a fluid having a speed into another substantially stagnant fluid volume.

According to an embodiment of the present invention, the fluid has a first temperature, and wherein the fluid is distributed into a layer in the substantially stagnant fluid volume having the same first temperature.

The second aspect may generally have the same advantages as the first aspect.

Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of said element, device, component, means, step, etc., unless explicitly stated otherwise. The steps of any method disclosed herein do not have to be performed in the exact order disclosed, unless explicitly stated.

BRIEF DESCRIPTION OF THE DRAWINGS

This and other aspects of the present invention will now be described in more detail, with reference to the appended drawings showing a currently preferred embodiment of the invention.

DETAILED DESCRIPTION

A low turbulent flow occurs when a fluid such as water flows in parallel layers where the mixing between the layers is kept to a minimum. In a thermal energy storage, a substantially stagnant fluid volume is used for storing the thermal energy. The fluid volume contains layers of fluid; each layer contains fluid with substantially the same temperature. When providing fluid to the storage, e.g. for adding new energy to the storage, it is important that the mixing of these layers is kept to a minimum. By providing the fluid in the correct layer, e.g. the layer with fluid having the same temperature as the provided fluid, such that the part of the provided fluid coming in contact with the already existing fluid volume has as a low speed, a low turbulent flow may be achieved. The flow profile of such a flow, which causes the flow to be less turbulent, may ensure that the different temperature layers of the fluid in the energy storage are kept intact to a large extent. By using a nozzle according to the present invention, such a flow may be achieved.

Figure 1:
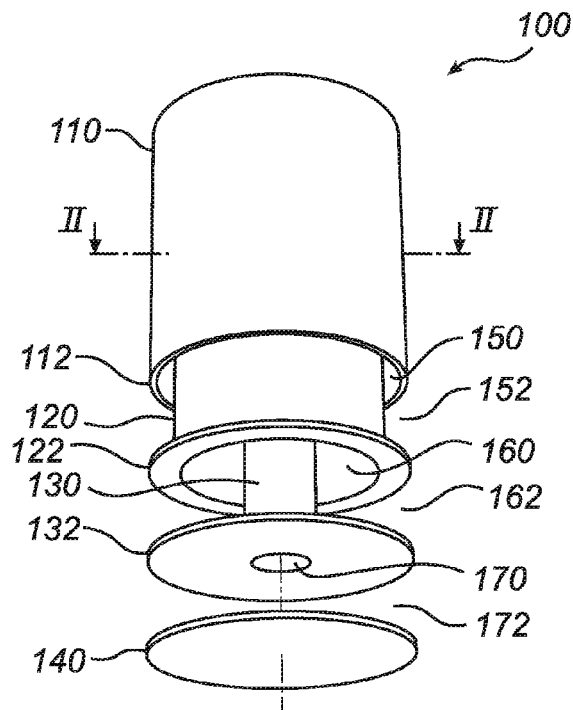
FIG. 1 is a perspective view of a nozzle according to an embodiment of the present invention.

FIG. 1 shows a perspective view of a nozzle 100. The nozzle 100 comprises an outer cylindrical wall 110. The outer cylindrical wall 110 may be the end part of a pipe from which a fluid is received by the nozzle 100. In another embodiment, the outer cylindrical wall is a separate part coupled to the pipe. The outer cylindrical wall 110 encloses an outer cylindrical partition wall 120. A flange 122 is protruding circumferentially from an end of the outer cylindrical partition wall 120. In one embodiment, an outer diameter of the flange 122 is the same as an outer diameter of the outer cylindrical wall 110. The outer cylindrical partition wall 120 encloses an inner cylindrical partition wall 130. A flange 132 is protruding circumferentially from an end of the inner cylindrical partition wall 130. In one embodiment, an outer diameter of the flange 132 is the same as the outer diameter of the outer cylindrical wall 110 and the outer diameter of the flange 122. Below the second flange is a bottom plate 140 positioned. The bottom plate 140 may be fastened to the second flange 132 by means of metal plates (not shown) not disturbing a fluid flowing through the nozzle, or by some other suitable fastening means readily known by one of ordinary skill in the art. The bottom plate 140 may also be fastened to other parts of the nozzle 100. An outer diameter of the bottom plate 140 may be the same as the above mentioned diameters. The diameters may differ in further embodiments of the nozzle 100.

The angles between the flanges and the walls are preferably orthogonal. Alternatively, the angles may be acute in order to further facilitate horizontal distribution of fluid.

The flow passages hence direct the flow radially such that fluid flows out from the nozzle substantially perpendicular to the fluid received by the nozzle. An effect of this is that the fluid can be received by the nozzle in a vertical direction, along the central axis of the inlets, and flow out of the nozzle in a horizontal direction along the central plane of the outlets. In other words, the flow passages may thus be configured to direct the flow in a radial manner, e.g. in all horizontal directions from the outlets of the nozzle. An advantage of having the fluid flow out from the nozzle in all horizontal directions is that this may reduce the risk of mixing any layers of existing fluid outside of the nozzle, e.g. in an energy storage. Another advantage is that the construction does not involve any small nozzles, a grid, or a net that can cause pressure drops. Furthermore, no big cones or similar are needed to reduce the velocity of the fluid entering the stagnant volume, wherein such cones only use part of the circumference for distribution and/or have geometry larger than the receiving pipe which complicates installation.

The diameters of the nozzle 100 depend on the size of the storage it will be used in. If the storage is a smaller heat water storage tank, the diameters may, e.g., be as small as 40 millimeter. If the storage is a large scale energy storage, the diameters may, e.g., be up to 2 meters.

The different parts of the nozzle 100 are preferably constructed of the same sort of metal to avoid galvanic corrosion. The metal may, e.g., be stainless in order to improve the durability of the nozzle. Alternatively, the nozzle is constructed of a plastic or ceramic material.

A first outer flow passage 150 is formed between the outer wall 110 and the outer partition wall 120. The first outer flow 150 passage has an outlet 152 defined by an end of the outer wall 112 and the first flange 122. The outlet 152 is thus extending circumferentially around the outer cylindrical partition wall 120. A central flow passage 160 is formed between the outer partition wall 120 and the inner partition wall 130. The central flow passage 160 has an outlet 162 defined by the first flange 122 and the second flange 132. The outlet 162 is thus extending circumferentially around the inner cylindrical partition wall 130. A second outer flow passage 170 is formed inside the inner partition wall 130. The second outer flow passage 170 has an outlet 172 defined by the second flange 132 and the bottom plate 140. The outlet 172 is thus an open circumferential space, except for the fastening means (not shown) of the bottom plate 140 discussed above. The flow passages 150, 160, 170 in the nozzle are used to direct the flow of the fluid and also to control the speed of the fluid flowing out of the outlets 152, 162, 172 of the passages 150, 160, 170.

The nozzle 100 may also be used to draw the fluid, e.g. for retrieving energy from the energy storage. In order to be able to draw the fluid efficiently, it is important to reduce the pressure drop of the fluid when drawn through the nozzle 100 and into the pipe. Pressure drop is the result of frictional forces on the fluid as it flows through the nozzle 100. A piping network containing many pipe fittings and joints, tube convergences, divergences, turns, surface roughness, and other physical properties will affect the pressure drop. Further, drawing fluid water having a temperature close to 100° C., using a pump at atmospheric pressure, may result in cavitations in the pump and in the boiling fluid. Therefore, the nozzle 100 is preferably designed with sparse geometry such that the pressure drop is reduced and such that it is well suited for retrieving fluid.

The exemplary embodiment of the nozzle 100 comprises two outer flow passages 150, 170. In further embodiments the nozzle 100 may be comprise any number of outer flow passages such as, e.g., four or six.

Figure 2:
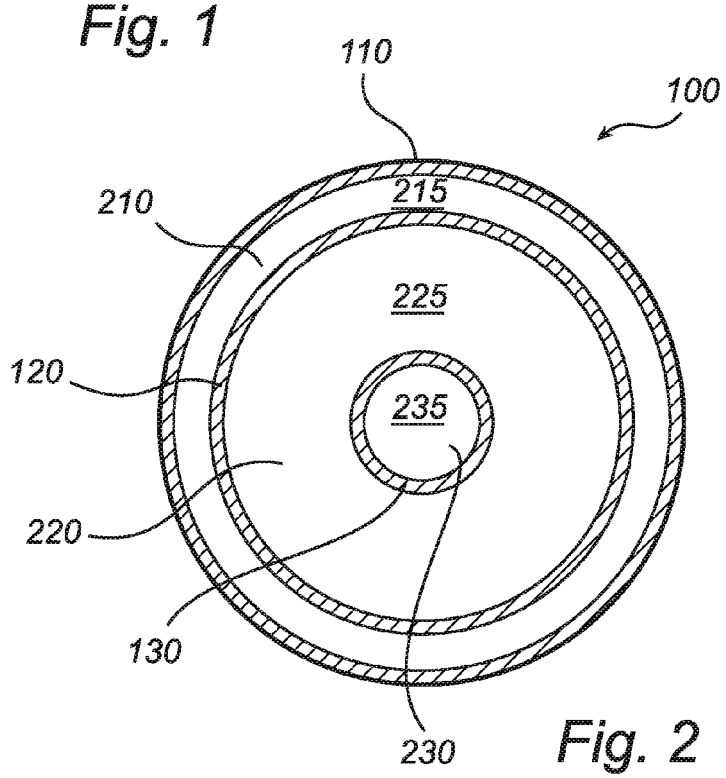
FIG. 2 is a cross sectional view taken along a line II-II of FIG. 1.

FIG. 2 shows a cross sectional view taken along a line II-II of FIG. 1 and shows exemplary proportions between the outer wall 110, the outer partition wall 120, and the inner partition wall 130. The outer wall 110 and the outer partition wall 120 define an inlet 210 of the first outer flow passage 150. The inlet has an area 215. The outer partition wall 120 and the inner partition wall 130 define an inlet 220 of the central flow passage 160. The inlet 220 has an area 225. The inner partition wall 130 defines an inlet 230 of the second outer flow passage 170. The inlet has an area 235. The thicknesses of the different walls 110, 120, 130 are similar in this embodiment but may differ in further embodiments. For example, if the outer wall 110 is part of the pipe leading fluid to the nozzle, the outer wall may be thicker than the partition walls 120, 130 due to the properties of and the requirements on the pipe.

Figure 3:
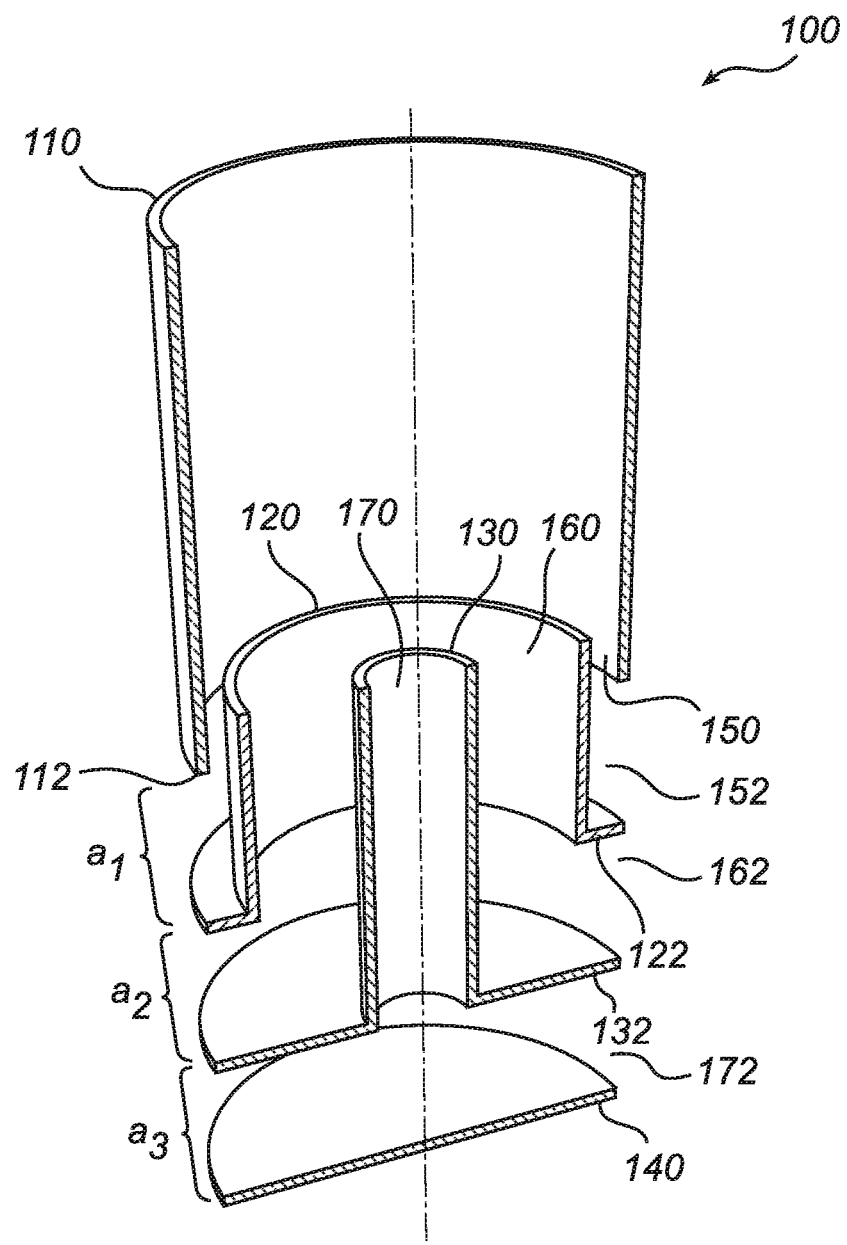
FIG. 3 is a perspective view of a cross section of the nozzle of FIG. 1.

FIG. 3 shows a perspective view of a cross section of the nozzle of FIG. 1. FIG. 3 shows the proportions of the outlet areas $a_1$, $a_2$, $a_3$ of the nozzle 100. As discussed above, the nozzle 100 may distribute a fluid having a speed into another substantially stagnant fluid volume in a non-turbulent way. The speed of the outflow of the fluid through the outlets 152, 162, 172 depends on the speed of the fluid as it enters the corresponding inlets, the areas 215, 225, 235 of the inlets 210, 220, 230 and the areas $a_1$, $a_2$, $a_3$ of the outlets 152, 162, 172.

The speed of the fluid received by the inlets 210, 220, 230 of the flow passages 150, 160, 170 depends on the properties of the pipe connected to the nozzle 100. In a very short pipe, the speed of a flowing fluid is substantially the same over an entire cross-section of the pipe. In a longer pipe, a speed profile of the flow looks like a cone. A part of the fluid flowing in the center of the pipe will have the highest speed. A part of the fluid flowing closer to the walls of the pipe will have a slower speed. The closer to the wall the fluid flows, the lower the speed gets.

Since the speed of the fluid in the pipe is not constant, as described above, the areas $a_1$, $a_2$ and $a_3$ must be adapted in a suitable way to achieve a low turbulence flow. It is e.g. well known that a larger outlet area gives a lower outlet speed. Any pipe fittings and joints, tube convergences, divergences, turns of the pipe or similar will also influence the speed profile of the fluid. Thus, preferably, the dimensions of the nozzle 100 are adapted to the pipe they are to be connected to. In other words, the dimensions of the nozzle 100 are preferably adapted for the speed profile of the fluid received by the nozzle 100. The nozzle 100 utilizes a small number of elements for forming the nozzle 100 with three flow passages 150, 160, 170. This allows for a time efficient and cost efficient manufacturing process. The design of the nozzle 100 further allows for simple modification of the dimension of the flow passages 150, 160, 170 when manufacturing the nozzle, making it simple to manufacture nozzles for varying conditions and with varying specifications.

A purpose of the fluid flowing out from the outer flow passages 150, 170 is to shield the substantially stagnant fluid volume from the fluid flowing out from the central flow passage 160 until it has decelerated enough such that turbulent mixing is reduced when it comes in direct contact with the substantially stagnant fluid volume. As mentioned before, an advantage of using the nozzle 100 for distributing a fluid into a substantially stagnant fluid volume is that any turbulent mixture between the stagnant fluid volume and the distributed fluid is kept to a minimum. This is done by allowing turbulence between a central portion of the distributed fluid, coming from outlet 162, and outer portions of the same, coming from outlets 152 and 172, but keeping turbulence between the outer portions and the stagnant fluid volume to a minimum. This is achieved by a nozzle 100 distributing the outer portions of the fluid with a substantially lower speed compared to the speed of the central portion. The speed of the fluid flowing out from the outer flow passages 150, 170 should be high enough, but not much higher, for fulfilling this purpose. In other words, the speed of the fluid flowing out of the outer flow passages should be as close to zero as possible, but still have enough speed to shield the substantially stagnant fluid volume from the fluid flowing out from the central flow passage 160 until it has decelerated enough in order to keep any turbulent mixing to a minimum when it comes in direct contact with the substantially stagnant fluid volume.

Figure 4:
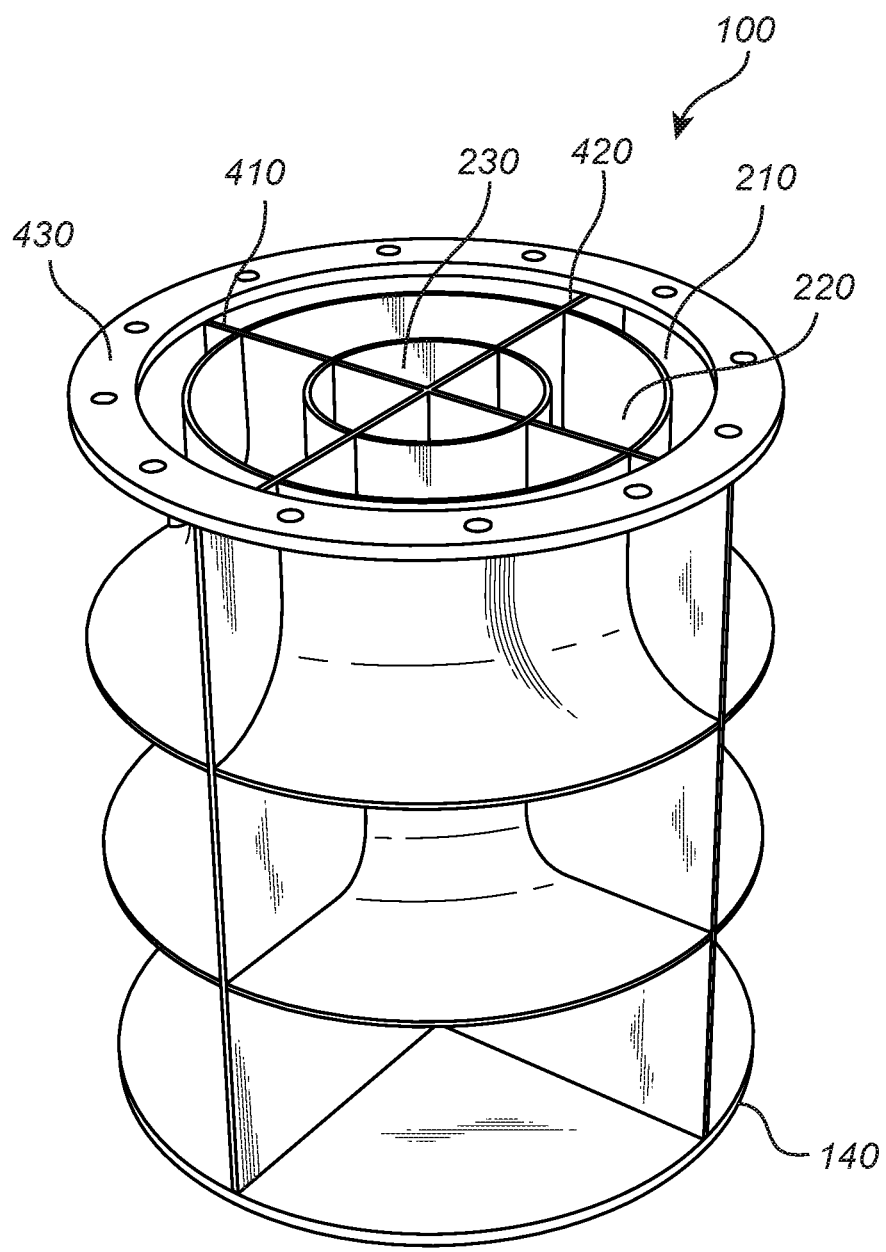
FIG. 4 is a perspective view of a nozzle according to an embodiment of the present invention.

FIG. 4 shows a perspective view of a nozzle 100 according to an embodiment of the present invention. This embodiment of the nozzle 100 comprises two sub-partition walls 410, 420. The sub-partition walls 410, 420 are flat and extend from an upper part of the nozzle to the bottom plate 140 such that the inlets 210, 220, 230 and the flow passages 150, 160, 170 each are divided into four equal parts. A plate 430 is provided to mount the nozzle 100 to a pipe. The sub-partition walls divide the flow of fluid into sub-flows which may be advantageous for achieving a more equally distributed outflow of the fluid from the nozzle in all directions. The number of sub-partition walls 410, 420 may in further embodiments be more than two.

The person skilled in the art realizes that the present invention by no means is limited to the embodiments described above. On the contrary, many modifications and variations are possible within the scope of the appended claims. For example, the area $a_2$ of the outlet 162 may be smaller than the corresponding inlet area 225 if it is advantageous to let the fluid flowing out from the outlet 162 reach far from the nozzle 100.

Having multiple outer flow passages from which fluids with decreasing velocity flow, wherein the outer flow passages closest to the central flow passage have the highest velocity, may further decrease turbulent mixing which is advantageous in that the velocity of the central flow may be higher.

The invention claimed is:

1. A nozzle for distribution of a liquid having a speed into a substantially stagnant liquid volume,
the nozzle having a first end and a second end, the nozzle comprising:
a first outer flow passage having an inlet arranged to receive the liquid from a pipe at the first end of the nozzle and an outlet at the second end of the nozzle, the first outer flow passage being defined by an area between an outer cylindrical wall and an outer partition wall;
a central flow passage having an inlet arranged to receive the liquid from the pipe at the first end of the nozzle and an outlet at the second end of the nozzle, the central flow passage being defined by an area between the outer partition wall and an inner partition wall; and
a second outer flow passage having an inlet arranged to receive the liquid from the pipe at the first end of the nozzle and an outlet at the second end of the nozzle, the second outer flow passage being defined by an area enclosed by the inner partition wall; and
the inlet and outlet of the first outer flow passage each has an area, the inlet and outlet of the central flow passage each has an area, and the inlet and outlet of the second outer flow passage each has an area;
wherein the area of the inlet of the second outer flow passage is smaller than the area of the outlet of the second outer flow passage; and
wherein the inlets and outlets of the first outer flow passage, central flow passage, and second outer flow passage are configured so that, when fluid passes through the nozzle from the inlet to the outlet, the outlets of the first outer flow passage, central flow passage, and second outer flow passage each direct fluid flow radially such that the direction of fluid flow out from the nozzle is substantially perpendicular to the direction of fluid flowing through the first outer flow passage, central flow passage, and second outer flow passage of the nozzle.

2. The nozzle according to claim 1, wherein
the first outer flow passage, central flow passage, and second outer flow passage have a common central axis; and
wherein the inner partition wall extends further along the common central axis at the second end of the nozzle compared to the outer partition wall, and the outer partition wall extends further along the common central axis at the second end of the nozzle compared to the outer cylindrical wall.

3. The nozzle according to claim 2, wherein
the outlet of the first outer flow passage is defined by an end of the outer cylindrical wall and a first flange extending from an end of the outer partition wall in a direction substantially perpendicular to the outer partition wall,
the outlet of the central flow passage is defined by the first flange and a second flange extending from an end of the inner partition wall in a direction substantially perpendicular to the inner partition wall, and
the outlet of the second outer flow passage is defined by the second flange and a bottom plate positioned below the second flange along the common central axis, the bottom plate extending substantially perpendicular to the common central axis.

4. The nozzle according to claim 1, wherein
wherein the area of the inlet of the first outer flow passage is smaller than the area of the outlet of the first outer flow passage.

5. The nozzle according to claim 4, wherein
the outlet area of the first outer flow passage is smaller than the outlet area of the second outer flow passage.

6. The nozzle according to claim 4, wherein
wherein the area of the inlet of the central flow passage is smaller than the area of the outlet of the central flow passage.

7. The nozzle according to claim 1, wherein
the area of the inlet of the central flow passage is smaller than the area of the outlet of the central flow passage.

8. The nozzle according to claim 1, wherein
the inlet areas and the outlet areas of the first outer flow passage, the central flow passage, and the second outer flow passage are adapted so that the speed of the liquid as it flows out of each outlet of the first and second outer flow passages is substantially lower than the speed of the liquid flowing out of the outlet of the central flow passage.

9. The nozzle according to claim 1, wherein
the first outer flow passage, central flow passage, and second outer flow passage have a common central axis; and
wherein at least one sub-partition wall extends along the common central axis and is configured to divide each of the first outer flow passage, central flow passage, and second outer flow passage into at least two substantially equally sized sub-flow passages.

10. The nozzle according to claim 9, wherein the at least one sub-partition wall comprises a first sub-partition wall and a second sub-partition wall that are arranged perpendicularly to each other.

11. The nozzle according to claim 1, wherein the pipe is a telescopic pipe.

12. A method for distributing of a liquid into a substantially stagnant liquid volume, comprising:
   providing a nozzle of claim 1, connected to a source of liquid at the inlets of the first outer flow passage, central flow passage, and second outer flow passage of the nozzle, so that the liquid may be dispensed through the outlets of the first outer flow passage, central flow passage, and second outer flow passage of the nozzle; and
   distributing the liquid through the nozzle into a substantially stagnant liquid volume.

13. The method of claim 12, wherein the substantially stagnant liquid volume is stratified into a plurality of layers having different liquid temperatures.

14. The method of claim 13, wherein the liquid has a first temperature, and wherein the liquid is distributed into a layer in the substantially stagnant liquid volume having the same first temperature.

* * * * *